(12) United States Patent
Rune

(10) Patent No.: US 8,634,839 B2
(45) Date of Patent: Jan. 21, 2014

(54) DYNAMIC POLICY SERVER ALLOCATION

(75) Inventor: Johan Rune, Lidingo (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 553 days.

(21) Appl. No.: 12/864,331

(22) PCT Filed: Jan. 29, 2008

(86) PCT No.: PCT/SE2008/050115
§ 371 (c)(1), (2), (4) Date: Jul. 23, 2010

(87) PCT Pub. No.: WO2009/096831
PCT Pub. Date: Aug. 6, 2009

(65) Prior Publication Data
US 2010/0298004 A1    Nov. 25, 2010

(51) Int. Cl.
*H04W 72/00* (2009.01)
(52) U.S. Cl.
USPC ............ 455/450; 455/452.1; 455/452.2
(58) Field of Classification Search
USPC ............ 455/450, 422.1, 433, 452.1
See application file for complete search history.

(56) References Cited

U.S. PATENT DOCUMENTS

| | | | |
|---|---|---|---|
| 6,885,871 B2* | 4/2005 | Caloud | 455/466 |
| 6,910,074 B1* | 6/2005 | Amin et al. | 709/227 |
| 6,937,566 B1* | 8/2005 | Forslow | 370/231 |
| 7,577,437 B1* | 8/2009 | Friman et al. | 455/450 |
| 7,933,205 B1* | 4/2011 | Shaw et al. | 370/235 |
| 8,103,282 B2* | 1/2012 | Freytsis et al. | 455/450 |
| 2007/0150934 A1 | 6/2007 | Fiszman et al. | |

FOREIGN PATENT DOCUMENTS

| | | |
|---|---|---|
| JP | 2006115059 A | 4/2006 |
| WO | 01/89234 A2 | 11/2001 |
| WO | 2007077958 A1 | 7/2007 |

OTHER PUBLICATIONS

Maniyeri, J. et al. "A Linux Based Software Router Supporting QoS, Policy Based Control and Mobility." Proceedings of the 8th IEEE International Symposium on Computers and Communications (ISCC'03), Piscataway, NJ, USA, Jun. 30-Jul. 3, 2003, pp. 101-107.

* cited by examiner

*Primary Examiner* — Temica M Beamer
(74) *Attorney, Agent, or Firm* — Coats & Bennett, P.L.L.C.

(57) ABSTRACT

A policy control architecture and method for dynamically allocating policy servers to mobile devices is described herein. The policy control architecture introduces a new policy control element called the policy server control function. The policy server control function dynamically allocates policy servers to mobile subscribers when the mobile subscribers attach to an access network. In some embodiments, the policy server control function may also deallocate policy servers when mobile subscribers detach from all access networks to make the policy server resources available for other mobile devices.

21 Claims, 4 Drawing Sheets

DYNAMIC POLICY SERVER ALLOCATION

TECHNICAL FIELD

The present invention relates generally to policy control for communication networks and more particularly to a policy control architecture and method for dynamically allocating policy servers.

BACKGROUND

Policy control is a process for controlling the use of network resources according to a predefined policy. The policy typically comprises a formal set of rules that govern how network resources may be used. When a mobile device attempts to access a network or invoke a service, the policy control function determines whether the access or service is allowed based on the policy established by the service provider. Policy rules may be enforced through admission control and/or quality of service (QoS) control.

In IP Multimedia Subsystem (IMS) networks, the policy control function is implemented by two functional entities: The policy enforcement point and the policy decision point. the policy enforcement point typically resides in a node through which user traffic flows. The policy enforcement point blocks or permits user traffic based on the applicable policies. The policy decision point is a policy server that determines what policy rules apply to a given service. A network typically comprises a plurality of policy decision points or policy servers that are allocated to serve particular mobile devices.

The demands for capacity in policy servers in emerging networks are likely to grow for several reasons. The current static nature of policies means that the policy decision point, or policy server, is typically involved only during service and bearer establishment. When more advanced and dynamic policies are introduced, the policy servers will have to continuously collect dynamic input data for making policy decisions. Additionally, the growing number of subscribers and the adoption rate of packet data services indicate that the load on policy servers will increase.

Given the increasing demands on policy servers, an efficient, flexible, and easily-scalable policy control architecture is needed to meet the increased demand on policy server resources.

SUMMARY OF THE INVENTION

The present invention provides a policy control architecture and method for dynamically allocating policy servers to mobile devices or mobile subscribers. The policy control architecture introduces a new policy control element called the policy server control function. The policy server control function dynamically allocates policy servers to mobile subscribers when the mobile subscribers attach to an access network. In some embodiments, the policy server control function may also deallocate policy servers when mobile subscribers detach from all access networks to make the policy server resources available for other mobile devices. The policy server control function receives attach/detach event notifications from a home subscriber server or other network element with an overview of multiple access networks. In response to attach event notifications, the policy server control function allocates a policy server from a pool of policy servers to a mobile subscriber. In some embodiments, the policy server control function may also receive detach event notifications and deallocate the policy servers when a mobile subscriber is no longer attached to any access network. The policy server control function also provides address information for allocated policy servers to other requesting entities, such as policy enforcement points and other policy server control functions.

DETAILED DESCRIPTION

Figure 1:
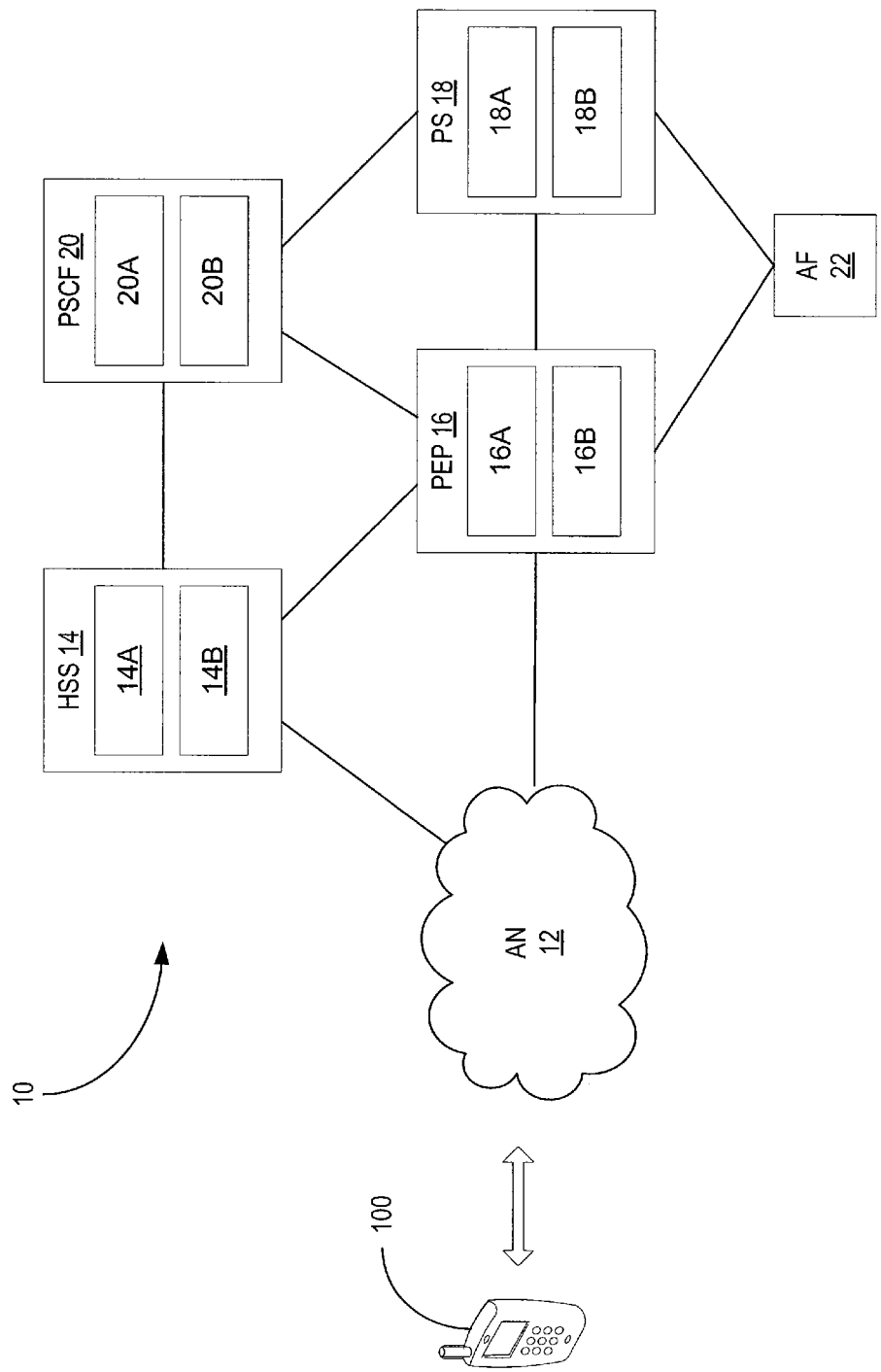
FIG. 1 illustrates an exemplary policy control architecture for a communication network.

FIG. 1 illustrates exemplary functional entities of a communication network 10 for implementing policy control. Policy control is a mechanism for implementing a set of policy rules that govern how network resources are used. When a mobile device 100 attempts to access network resources or to invoke certain services, the policy control function determines whether the access or service is allowed based on a set of policy rules. The policy rules may be session specific or session non-specific, and pre-defined or dynamic. The policy control function monitors the traffic in the user plane to ensure that the policy rules are not violated. As one example, the policy rules may specify the types of codecs or media bearers that are allowed for a particular data service flow. The policy control architecture illustrated in FIG. 1 may be used, for example, to implement policy control in IMS networks or other IP networks.

The main components of the network 10 comprise an access network (AN) 12, home subscriber server (HSS) 14, policy enforcement point (PEP) 16, policy server (PS) 18, policy server control function (PSCF) 20, and application function (AF) 22. Those skilled in the art will appreciate that the functional entities such as the HSS 14, PEP 16, PS 18, PSCF 20, and AF 22 may be implemented in a computer with suitable processing and memory resources.

The AN 12 provides mobile devices 100 with access to the communication network 10. The AN 12 may, for example, comprise cellular networks such as Universal Mobile Telecommunications System (UMTS), Wideband Code Division Multiple Access (WCDMA), Global System for Mobile Communications (GSM), or Code Division Multiple Access (CDMA) networks providing wireless mobile communication services to mobile telephones and other mobile devices. The AN 12 could also comprise a wireless local area network (WLAN) such as a Wireless Fidelity (WiFi) or Worldwide Interoperability for Microwave Access (WiMax) network. The present invention should also work with future access technologies.

The HSS 14 is the central repository for subscriber information. The HSS comprises a processor 14A and memory 14B for performing the functions herein described. The HSS 14 stores subscriber data required for handling multimedia sessions in memory 14B. This data includes information such as the subscriber name and ID, location, user profiles including subscriber services and QoS requirements, and other subscriber-related information. The HSS 14 is notified when a subscriber attaches to or detaches from the access network 12 and stores this information in a subscriber database in memory 14B. A single HSS 14 may serve multiple ANs 12 using different radio access technologies. Thus, the HSS 14 may, in some embodiments, have knowledge of the subscriber status in multiple ANs 12. As will be described hereinafter, the HSS 14 may also store the addresses of PSs 18 assigned to subscribers. The HSS 14 may include a Subscription Profile Repository as described in 3GPP standards. The Lightweight Directory Access Protocol (LDAP) may be used for communication with other network entities, such as the PSCFs 20, PSs 18, and PEPs 16.

The PEP 16 is a policy control element responsible for enforcing policy rules in the user plane. PEP 16 comprises a processor 16A and memory 16B for performing the functions herein described. While shown as a separate network element in FIG. 1, the PEP 16 is typically located in a gateway connecting AN 12 to an IMS network or other IP network. In a GSM or UMTS network, the PEP 16 may be located at the GGSN. For a WLAN interworking with a UMTS network, the PEP 16 may be located at the PDG. PEP 16 receives access requests and service requests from mobile devices 100. The PEP 16 evaluates whether the requested access or services are allowed based on the applicable policy rules. In response to an access or service request, the PEP 16 may request a policy decision from a PS 18. A policy decision comprises a set of policy rules to be applied by the PEP 16 to the access or service request. The PEP 16 may grant access to network resources or deny access or service requests according to the policy rules. The PEP 16 may, for example, comprise a policy and charging rules enforcement function (PCEF) as described in 3GPP TS 23.203 V. 7.4.0 (September 2007).

The PS 18 is a policy control element responsible for determining the policy rules applicable to a service data flow. The PS 18 functions as a policy decision point (PDP). PS 18 comprises a processor 18A and memory 18B for performing the functions herein described. The PS 18 collects information from a variety of sources for determining relevant policy rules and decides how a certain service data flow shall be treated. PS 18 receives policy requests from PEPs 16 and other entities and makes policy decisions. The network 10 may comprise a plurality of PSs 18 which may be dynamically allocated as hereinafter described. The PS 18 and PEP 16 may communicate using known protocols such as RMI, COPS, Radius, Diameter, etc. The PS 18 may, for example, comprise a policy and charging rules function (PCRF) as described in 3GPP TS 23.203 V. 7.4.0 (September 2007).

The PSCF 20 is a policy server control function that dynamically allocates PSs 18 to mobile devices 100 or mobile subscribers when the mobile devices 100 attach to an access network 12. For simplicity, reference to the allocation of PSs 18 to mobile devices 100 in the specification and claims should be understood to include allocation of PSs 18 to subscribers of network-based communication services who use a mobile device 100 to access network services and resources. The PSCF 20 comprises a processor 20A and memory 20B for performing the functions herein described. In some embodiments, the PSCF 20 may also de-allocate the PSs 18 when the mobile device 100 detaches from the AN 12 to make the policy server resources available for other mobile devices 100. The PSCF 20 is also responsible for providing the addresses of PSs 18 to other policy control elements. For example, the PSCF 20 may provide address information for PSs 18 to PEPs 16, the HSS 14, and/or other PSCFs 20. When the mobile device 100 is roaming, the PSCF 20 may provide address information for home PSs 18 to PEPs 16 and/or PSCFs 20 in the visited network. The PSCF 20 has no corresponding element in 3GPP TS 23.203 V. 7.4.0 (September 2007).

The AF 22 is an entity offering application or services that require dynamic policy control over user plane behavior. AF 22 communicates with the PS 18 to transfer session information, which may be used for selecting the appropriate policy rules. One example of an application function is the P-CSCF in an IMS system. The AF 22 is described in 3GPP TS 23.203 V. 7.4.0 (September 2007).

The exemplary embodiments of the invention provide a mechanism for dynamic allocation of PSs 18 from a pool of PSs 18 in a way that allows efficient, flexible, and easily scalable management of policy server resources. The PSCF 20 uses events that correspond to a mobile device's attachment/detachment from an AN 12 as triggers to allocate/deallocate PSs 18. The attach/detach event triggers are preferably channeled through an entity, such as the HSS 14, that has an overview of the mobile device's attach/detach status in multiple ANs 12, which may implement different access technologies. The HSS 14 notifies a PSCF 20 of attach events and of detach events in some embodiments. The PSCF 20 allocates a PS 18 to the mobile device 100 responsive to the attach event and may direct policy requests from other policy control entities (e.g., PEPs 16) to the allocated PSs 18. There are two basic variants of the PSCFs 20: stateless and stateful. The stateless PSCF 20 may be kept simple; however, the stateful PSCF 20 is better adapted to handle requests form other policy control entities.

Figure 2:
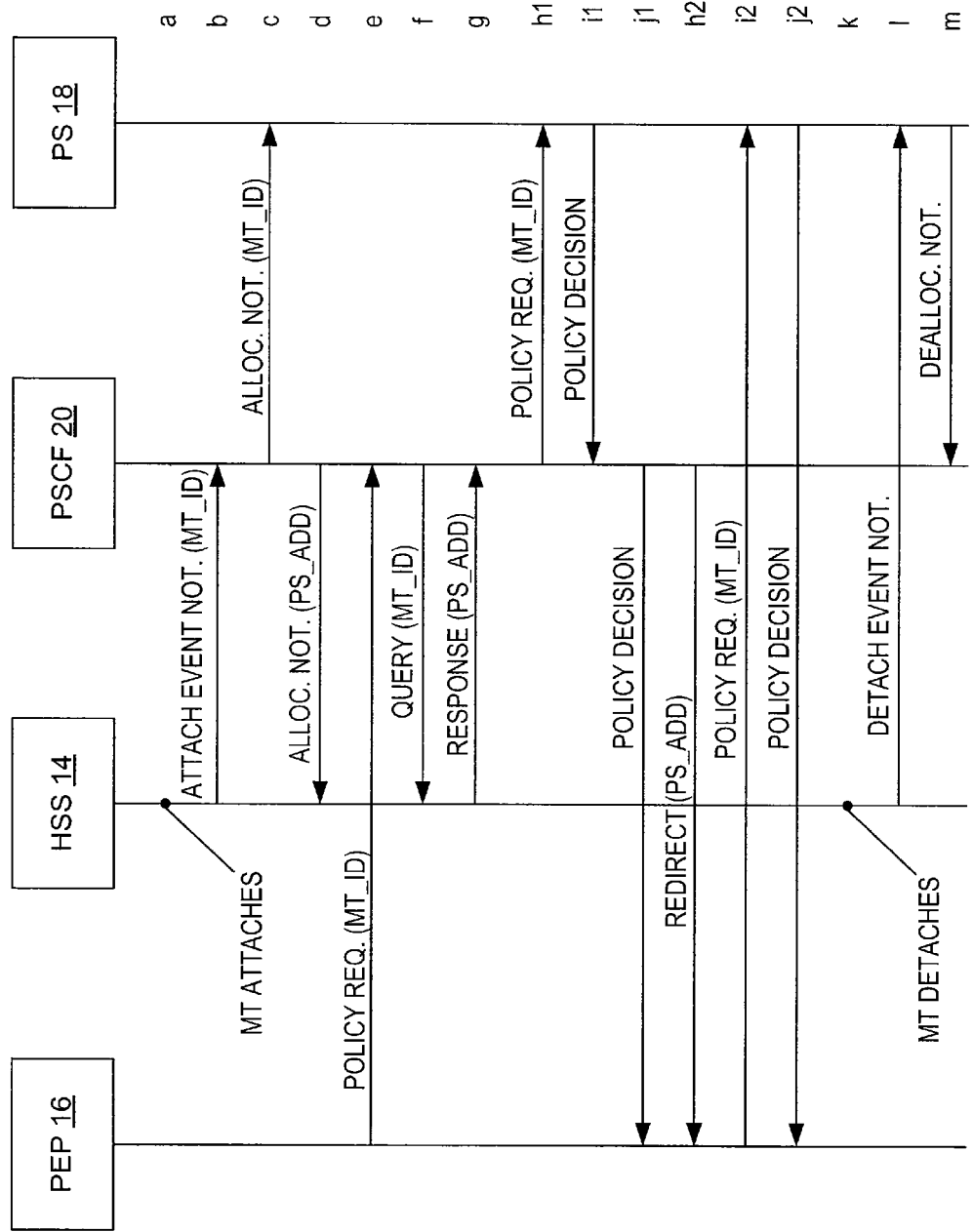
FIG. 2 illustrates exemplary policy control procedures using a stateless policy server control function according to a first embodiment.

FIG. 2 illustrates operation of an exemplary stateless PSCF 20 according to one embodiment. The HSS 14 detects an attach event when a mobile device 100 attaches to an AN 12 (step a). In order to receive attach event notifications from the HSS 14, the PSCF 20 may subscribe to attach events from the HSS 14. For example, the PSCF 20 may subscribe to attach events using SIP or diameter protocols.

In response to the attach event, the HSS 14 sends an attach event notification to the PSCF 20 (step b). The attach event notification includes a mobile device identifier associated with the mobile device 100. The PSCF 20 allocates a PS 18 to implement the policy control function for the mobile device 100 and sends an allocation notification to the selected PS 18 (step c). The assignment notification includes the identity of the mobile device 100 to which the PS 18 has been allocated. The PS 18 stores this information in its memory 18B, retrieves the relevant profiles and policies, and may start to collect input data. The PSCF 20 also sends an allocation notification to the HSS 14 as a response to the attach event notification (step d). The allocation notification includes the address of the PS 18 that is allocated to the mobile device 100. The HSS 14 stores an association between the mobile device identifier and the PS address in its subscriber database to use for directing future policy requests to the allocated PS 18.

When a requesting node needs a policy decision from the PS 18, it sends the policy request to the PSCF 20 (step e). The requesting node may, for example, comprise a PEP 16 or a PSCF 20 in a remote network. The policy request includes an identifier for the mobile device 100 for which a policy decision is needed. The PSCF 20 may act as either a relay server or a redirect server. In either case, upon receipt of the request, the PSCF 20 queries the HSS 14 for the address of the PS 18 allocated to the mobile device 100 (step f). As previously noted, the HSS 14 stores an association between the mobile device identifier and the allocated PS 18. The HSS 14 looks up the PS 18 allocated to the mobile device 100 specified in the query and returns the PS address to the PSCF 20 as a response to the query (step g). When the PSCF 20 acts as a relay server, it forwards the policy request to the allocated PS 18 (step h1) and relays the subsequent reply from the PS 18 to the requesting node (steps i1 and j1). When the PSCF 20 acts as a redirect server, the PSCF 20 sends a redirect message to the requesting node, including the address of the allocated PS 18 (step h2). The requesting node may then contact the PS 18 directly. The requesting node resends the policy request to the PS 18 (step i2), to which the PS 18 responds with its policy decision (step j2).

The PS 18 may also be deallocated when the mobile device 100 detaches from all ANs 12. When the HSS 14 detects detach events (step k), it determines whether the mobile device 100 is currently attached to any AN 12. If so, the detach event may be ignored. If the mobile device 100 is no longer attached to any AN 12, the HSS 14 determines the allocated PS 18 and sends a detach event notification to the PS 18 to deallocate the PS 18 (step l). The deallocation frees the policy server resources to be used for other mobile devices 100. In some embodiments, the PS 18 may send a deallocation notice to the PSCF 20 when it has been deallocated (step m). The allocated PSs 18 may have implicit subscriptions to receive detach events notification from the HSS 14.

Figure 3:
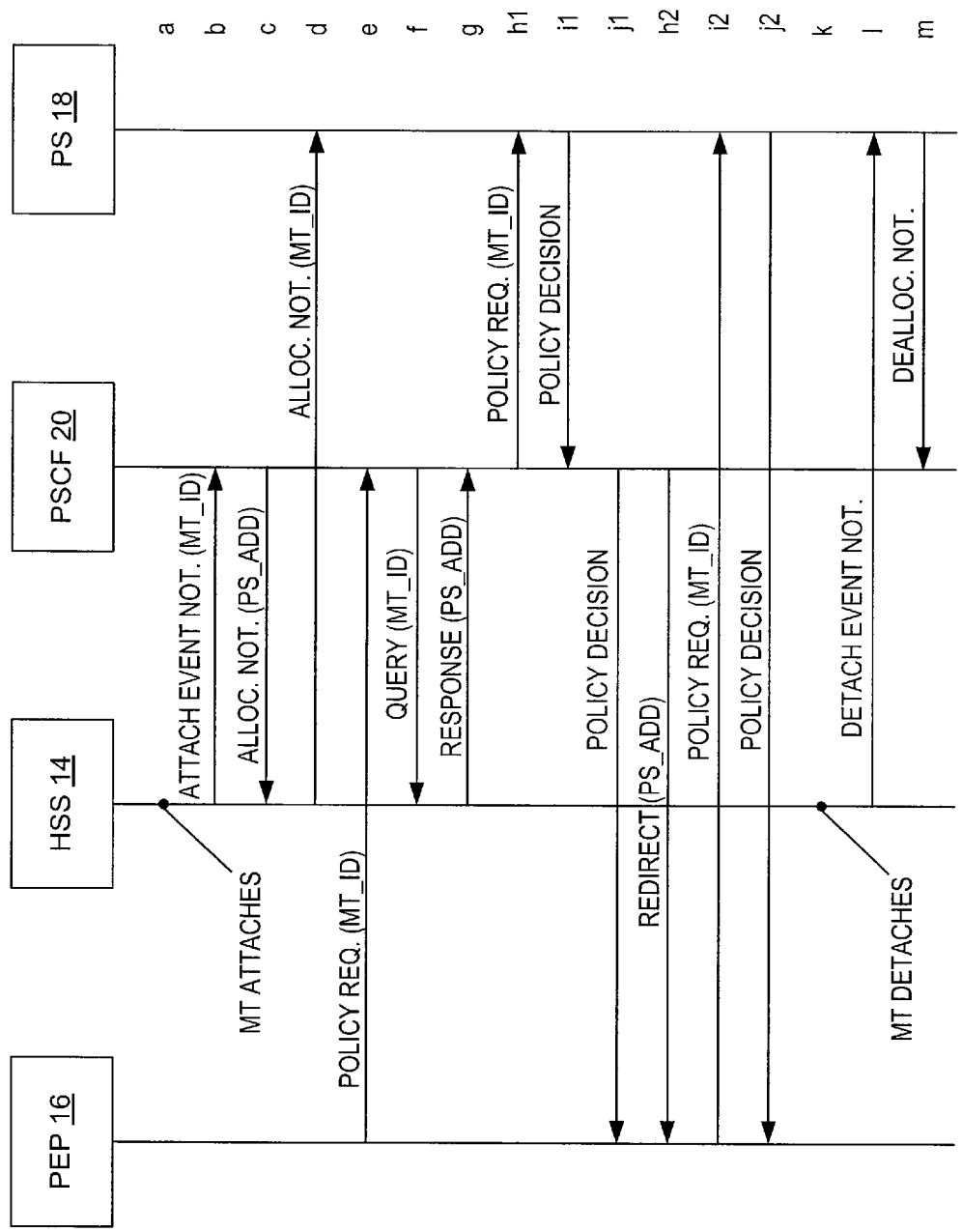
FIG. 3 illustrates exemplary policy control procedures using a stateless policy server control function according to a second embodiment.

In some embodiments, the HSS 14 may be responsible for notifying PS 18 when the PS 18 is allocated to a mobile device 100 as shown in FIG. 3. In this case, the HSS 14 notifies the PSCF 20 (step b) when an attach event occurs (step a). The PSCF 20 allocates a PS 18 to the mobile device 100 as previously described. However, the PSCF 20 does not send an allocation message to the PS 18. Instead, the PSCF 20 sends an allocation message to the HSS 14 including the address of the allocated PS 18 (step c). The HSS 14 in turn may send an allocation message to the allocated PS 18 to notify the PS 18 that it has been allocated to a particular mobile device 100 (step d). Steps e-m are the same as previously described.

In the embodiments shown in FIGS. 2 & 3, the requesting node may alternatively query the HSS 14 directly for the address of an allocated PS 18, rather than send the policy request to the PSCF 20. For example, assume that the requesting node comprises a Serving Call Session Control Function (S-CSCF) in an IP Multimedia Subsystem (IMS) network. When the mobile device 100 registers with the S-CSCF for IMS services, the S-CSCF may query the HSS 14 for the address of the PS 18 and then contact the PS 18 directly without going through the PSCF 20.

The stateless PSCF 20 allows the PSCF 20 to be very simple with only a few limited functions. However, this approach allows only relatively simple allocation algorithms for allocating PSs 18. For example, the PSCF 20 could allocate PSs 18 according to a simple round-robin scheme. According to one embodiment, a load balancing allocation scheme may be implemented through a slight compromise in statefulness. To enable a load balancing allocation scheme, the PSCF 20 could maintain a separate counter in its memory 18B for each PS 18 reflecting the number of mobile devices 100 currently served by each PS 18. The allocation counter for a PS 18 would be increased each time PS 18 is allocated to a new mobile device 100, and decremented each time the PS 18 is deallocated. Since the stateless PSCF 20 is not involved in deallocation, the PSs 18 would have to inform the PSCF 20 when the PS 18 is deallocated (step m in FIG. 2). A PSCF 20 implementing this kind of load-based allocation scheme would thus maintain a PS state (count) for each PS 18, but would not be required to maintain subscriber state for each subscriber. Therefore, the PSCF 20 could still be regarded as more or less a stateless PSCF 20.

Figure 4:
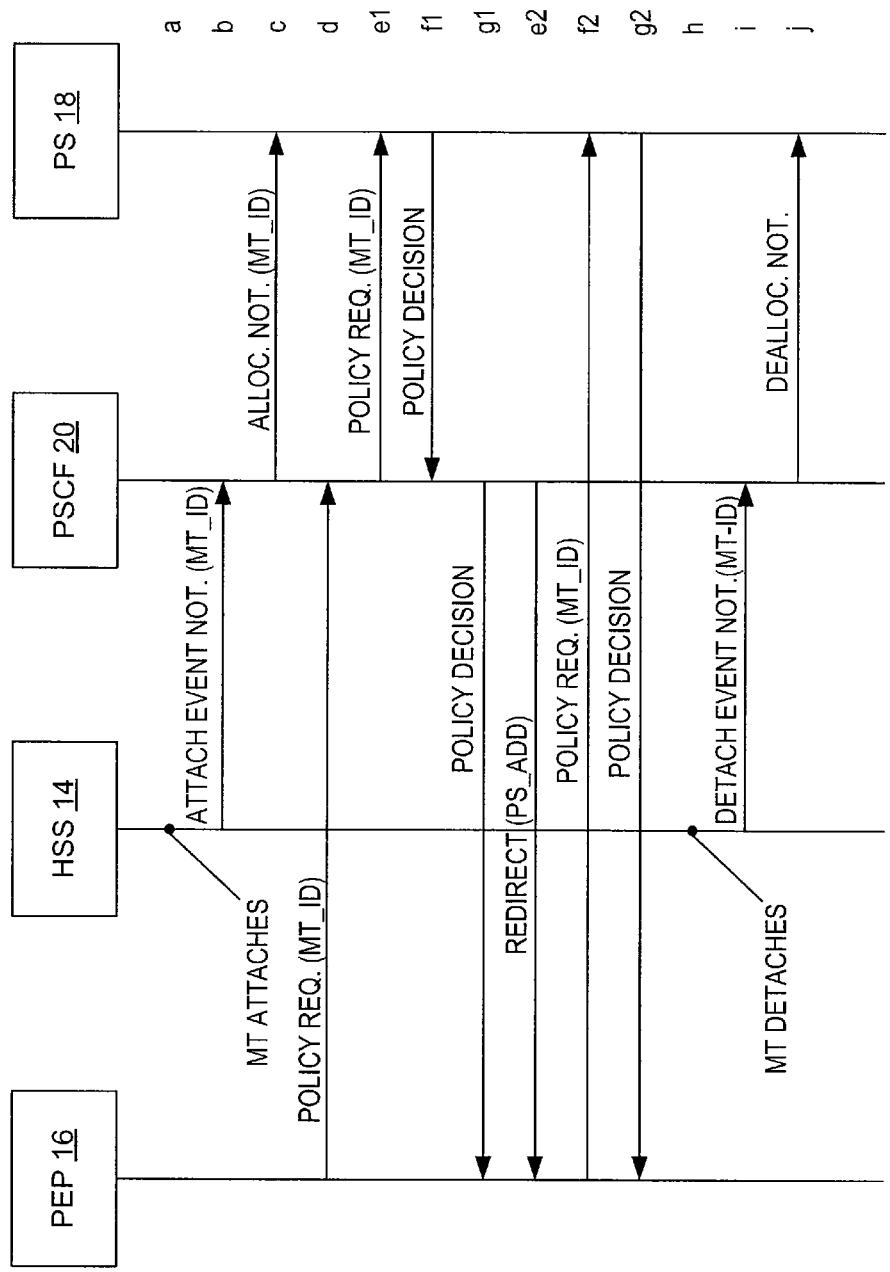
FIG. 4 illustrates exemplary policy control procedures using a stateful policy server control function.

FIG. 4 illustrates the operation of a stateful PSCF 20 according to another exemplary embodiment. The stateful PSCF 20 allocates PSs 18 to mobile devices 100 in a manner similar to that previously described. Additionally, the stateful PSCF 20 is involved in deallocation of PSs 18. The stateful PSCF 20 may subscribe to attach/detach event notifications from the HSS 14. In this embodiment, the PSs 18 do not need to subscribe to detach events from the HSS 14. When the HSS 14 detects an attach event (step a), the HSS 14 sends an attach event notification to the PSCF 20 in accordance to the subscription for attach events (step b). The PSCF 20 allocates a PS 18, stores the allocation in its internal records, and sends an allocation notification to the PS 18 (step c). When the PS 18 is allocated to a mobile device 100, it retrieves the relevant profiles and policies and may start to collect input data. The PSCF 20 may optionally inform the HSS 14 of the allocation.

When a requesting node, such as a PEP 16 or AF 22, needs to contact the PS 18 for a mobile device 100, the requesting node sends a policy request to the PSCF 20 (step d). The policy request includes an identifier associated with the user or mobile device 100. The PSCF 20 may act as either a relay server or redirect server. In either case, the PSCF 20 consults its internal records to determine the address of the PS 18 allocated to the mobile device 100. When the PSCF 20 acts as a relay server, it forwards the policy request to the allocated PS 18 (step e1) and relays the subsequent reply from the PS 18 to the requesting node (steps f1 and g1). When the PSCF 20 acts as a redirect server, the PSCF 20 sends a redirect message to the requesting node, including the address of the allocated PS 18 (step e2). The requesting node may then contact the PS 18 directly. The requesting node resends the policy request to the PS 18 (step f2), to which the PS 18 responds with its policy decision (step g2). The requesting node may store the address of the PS 18 for future use.

When the HSS 14 detects that the mobile device 100 is no longer attached to any AN 12 (step h), it sends a detach event notification including the mobile device identifier to the PSCF 20 (step i). The PSCF 20 deallocates the PS 18 and sends a deallocation notification to the concerned PS 18 (step j).

If SIP is used for interaction between the involved nodes, the stateful PSCF 20 may be seen as a back-to-back user agent, or a combined back-to-back user agent and redirect server. During policy server allocation, the PSCF 20 acts as a back-to-back user agent. When handling policy requests, it acts as either a back-to-back user agent in the relay case, or as a redirect server in the redirection case.

Because the stateful PSCF 20 is responsible for allocation and deallocation of PSs 18, it may keep track of the number of mobile devices 100 allocated to each PS 18 and may implement load balancing schemes as previously described.

In the Third Generation Partnership Project System Architecture Evolution (3GPP SAE) architecture, policy server allocation in a visited network may be performed in essentially the same manner as described above. The HSS 14 in the visited network is involved as a proxy Authentication Authorization Accounting (AAA) server for user authentication when the mobile device 100 attaches to the visited network. At this point, the HSS 14 in the visited network may trigger a policy server allocation to the visiting mobile device 100 by sending an attach event notification to the PSCF 20 in the visited network. The HSS 14 in the home network may also trigger a policy server allocation in the home network when notified that the subscriber is attached to the visited network. The attach event notification to the PSCF 20 in the home network may indicate that the mobile device 100 is roaming in a visited network and that there is a PS 18 allocated to the mobile device 100 in the visited network. The allocation notification sent to the PS 18 may also inform the PS 18 that the subscriber is roaming and there is a PS 18 allocated to the mobile device 100 in the visited network. The PS 18 in the home network may use this information to retrieve relevant policies from the PS 18 in the visited network responsive to a policy request. Similarly, the PS 18 in the visited network knows from the mobile device identity that the subscriber is a roaming and that therefore there is a PS 18 allocated to the mobile device 100 in the subscriber's home network. The PS 18 in the visited network may retrieve policy information from the PS 18 in the home network.

A PS 18 in the home network or in the visited network may locate a PS 18 in another network through the PSCF 20 in the remote network. The PSCF 20 in the remote network may be located, for example, through a DNS service request. A DNS service request is a DNS request for an IP address or FQDN of an entity that supports a particular service. The DNS request typically contains the FQDN of the concerned domain (i.e., the home or visited network domain in this context) prepended by a prefix indicating the particular service concerned. Alternatively, the HSSs 14 in the different networks may exchange addresses of the PSCFs 20, as well as other information such as port numbers and supported transport protocols, through Diameter during mobile device authentication procedures. This information may be passed to the allocated PS 18 during the PS 18 allocation procedure. This information exchange is preferably bi-directional, so that the HSS 14 and the allocated PS 18 in the visited network are informed of the address (and possibly other information) of the PS 18 allocated in the home network and the HSS 14 and the allocated PS 18 in the home network are informed of the address (and possibly other information) of the PS 18 allocated in the visited network.

In the embodiments described above, a home subscriber server functions as the source for allocation and deallocation triggers. In some embodiments, gateways may be used in place of the home subscriber server to generate allocation/deallocation triggers. One possible disadvantage of this approach is that there may be many gateways and that the gateways do not have a complete overview of the user's attachment status. One solution is to assign a centralized entity to maintain the overall status for the user based on information received from the gateways. For example, the overall status of users could be maintained by the PSCF 20. Each of the gateways could report changes in the user's status to the PSCF 20, which maintains the overall status for the user.

In one exemplary embodiment, the gateways may report that the user is "attached" if the user has established a session with the gateway, and report that the user is detached when the session is terminated. The PSCF 20 may maintain a state for each gateway. The user's overall status would be "attached" if the user is attached to at least one gateway, and "detached" if the user is not attached to any gateway. The allocation and deallocation of policy servers 18 for a given user may then be triggered by changes in the overall status of the user as maintained by the PSCF 20.

If a single gateway is the sole gateway for all traffic from a user, the gateway may provide triggers for the allocation/deallocation of policy server resources. As one example, a gateway/home agent (GW/HA) in an SAE network may be the source of triggers for allocation/deallocation of policy server resources. A PS 18 may be allocated to a subscriber when the subscriber's mobile device registers its first binding in the SAE GW/HA. As long as the mobile device has a binding registered in the SAE GW/HA, or is attached to his home network, the PS 18 remains allocated. When the mobile device is attached to his home network, it may not have a binding registered in the SAE GW/HA, but the SAE GW/HA will still be aware of the mobile device's presence since it is involved in the signaling triggered by the mobile device's network attachment. Also, it may receive a request from the mobile device to deregister a previous care-of address while the mobile device is attached to its home network.

An alternative to using registered bindings and home network presence as criteria for keeping a PS 18 allocated could be to use security associations (SAs) that protect the signaling between the mobile device and the SAE GW/HA. The policy server allocation could then be triggered when the SAs are established between the SAE GW/HA and a given mobile device, and would remain allocated as long as the SAE GW/HA has at least one valid SA for the mobile device.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of dynamically allocating a policy server to a mobile device, said method comprising:
   receiving from a home subscriber server an attach event notification when a mobile device attaches to an access network; and
   dynamically allocating a policy server from a pool of policy servers to said mobile device responsive to said attach event notification.

2. The method according to claim 1, further comprising subscribing to receive said attach event notifications from said home subscriber server.

3. The method according to claim 1, further comprising sending an allocation notification to said allocated policy server including a mobile device identifier identifying the mobile device to which the policy server is allocated.

4. The method according to claim 1, further comprising receiving a policy request from a requesting node, said policy request including a mobile device identifier.

5. The method according to claim 4, further comprising sending a redirect message to the requesting node including an address of the policy server allocated to said mobile device identified by said policy request.

6. The method according to claim 4, further comprising:
   relaying said policy request to the policy server allocated to said mobile device identified by said request;
   receiving a policy response from said selected policy server; and
   forwarding said policy response to said requesting node.

7. The method according to claim 1, further comprising:
   maintaining a count for each policy server in said pool reflecting a current load on each policy server; and
   allocating policy servers to mobile devices based on the current loads on said policy servers.

8. The method according to claim 7, further comprising receiving a deallocation notification from one of said policy servers indicating that said policy server has been dynamically deallocated, and updating said count for the deallocated policy server.

9. The method according to claim 1, wherein the attach event notification is received from a home subscriber server and further comprising sending an address of the allocated policy server to the home subscriber server.

10. The method according to claim 1, further comprising storing said address of the allocated policy server and a mobile device identifier for said mobile device in a policy server database.

11. A policy server controller for dynamically allocating policy servers to mobile devices, said policy server controller having a processor and a memory whereby the policy server controller is configured to:
   receive an attach event notification when a mobile device attaches to an access network; and
   dynamically allocate a policy server from a pool of policy servers to said mobile device responsive to said attach event notification.

12. The policy server controller according to claim 11, wherein the policy server controller is configured to receive said attach event notifications from a home subscriber server.

13. The policy server controller according to claim 12, wherein the policy server controller is further configured to subscribe to receive said attach event notifications from said home subscriber server.

14. The policy server controller according claim 11, wherein the policy server controller is further configured to send an allocation notification to said policy server including a mobile device identifier identifying the mobile device to which the policy server is allocated.

15. The policy server controller according claim 11, wherein the policy server controller is further configured to receive a policy request from a requesting node, said policy request including a mobile device identifier.

16. The policy server controller according to claim 15, wherein the policy server controller is further configured to send a redirect message to the requesting node including an address of the policy server allocated to said mobile device identified by said policy request.

17. The policy server controller according to claim 15, wherein the policy server controller is further configured to:
   relay said policy request to said policy server allocated to said mobile device identified by said request;
   receive a policy response from said selected policy server; and
   forward said policy response to said requesting node.

18. The policy server controller according to claim 11, wherein the policy server controller is further configured to:
   maintain a count for each policy server reflecting a current load on each policy server; and
   allocate policy servers to mobile devices based on the current loads on said policy servers.

19. The policy server controller according to claim 18, wherein the policy server controller is further configured to receive a deallocation notification from one of said policy servers indicating that said policy server has been dynamically deallocated, and updating the count for the deallocated policy server.

20. The policy server controller according to claim 11, wherein the policy server controller is further configured to send an address of the allocated policy server to the home subscriber server.

21. The policy server controller according to claim 11, wherein the policy server controller is further configured to store said address of the allocated policy server and a mobile device identifier for said mobile device in memory.

* * * * *

UNITED STATES PATENT AND TRADEMARK OFFICE
CERTIFICATE OF CORRECTION

| | | |
|---|---|---|
| PATENT NO. | : 8,634,839 B2 | Page 1 of 1 |
| APPLICATION NO. | : 12/864331 | |
| DATED | : January 21, 2014 | |
| INVENTOR(S) | : Rune | |

It is certified that error appears in the above-identified patent and that said Letters Patent is hereby corrected as shown below:

On the Title Page, (75), under "Inventors", in Column 1, Line 1, delete "Lidingo" and insert -- Lidingö --, therefor.

In the Specification

In Column 1, Line 24, delete "the policy" and insert -- The policy --, therefor.

In Column 4, Line 28, delete "form" and insert -- from --, therefor.

Signed and Sealed this
Eighth Day of July, 2014

Michelle K. Lee
*Deputy Director of the United States Patent and Trademark Office*